UNITED STATES PATENT OFFICE.

YOSHIZUMI TAHARA, OF TOKYO, JAPAN.

TETRODOTOXIN AND PROCESS OF EXTRACTING THE SAME.

1,058,643. Specification of Letters Patent. Patented Apr. 8, 1913.

No Drawing. Application filed January 5, 1912. Serial No. 669,535.

*To all whom it may concern:*

Be it known that I, YOSHIZUMI TAHARA, a subject of the Emperor of Japan, residing at 2 Yechizembori Nichome, Kyobashiku, Tokyo, Japan, have invented a certain new and useful Tetrodotoxin and Process of Extracting the Same; and I do hereby declare the following to be a full, clear, and exact description of the invention, such as will enable others skilled in the art to which it appertains to make and use the same.

The present invention consists of chemical processes of extracting tetrodotoxin, the toxin of *Tetrotodon* (Jap. "*Fugu*"), and refining thereof to its pure state after removing both organic and inorganic matters together with various other impurities from the viscera of *Tetrodon* and the products obtained by the processes. One result of the said invention, is to render possible the use of a very small amount of toxin, by physicians, for the purpose of curing and healing certain diseases with the utmost safety and with satisfactory results.

The following is a detailed description of the invention:—The viscera, particularly the ovary and the liver, of *Tetrodon* is taken out, and sliced, previous to its squashing, and a 3% formalin solution is freely added. After standing for several days in order to be infused, the mixture is filtered. The residue is again and again washed with 1% formalin solution until extraction is completed. The filtered formalin liquids, then, are mixed together and heated to the temperature of about 80° C. to solidify the albuminous substances contained therein, and again filtered. After concentrating and cooling this liquid, lead acetate or baryta water is added to the solution to precipitate other impurities except tetrodotoxin, and filtered again. When the lead acetate is used for the purpose of precipitating impurities, the filtered liquid is treated with hydrogen sulfid to get rid of the superfluous lead, and then filtered and concentrated. To this concentrated liquid, after it has cooled, copper sulfate solution or lead acetate or other heavy metallic salt solution, and a small amount of caustic alkaline solutions or ammonia water are added to effect total precipitation of tetrodotoxin with heavy metallic hydrate. This precipitate is filtered, and the residue left in the filter is washed with ammonia or caustic alkaline solution or distilled water according to the nature of the heavy metallic salt used in the precipitation, and ground, diluting it with ammonia or caustic alkaline solution, and then, a large amount of water is mixed, and left in a settling tank to settle. As soon as settling is completed, the liquid is drawn off by some suitable means. This process is repeated again and again until the liquid shows only slightly a reaction of hydrochloric or sulfuric acid when tested with the reagents for respective acid, viz. silver or barium nitrate reaction. Now the precipitate left in the settling tank is taken out, and mixed with a necessary amount of distilled water, through which is passed hydrogen sulfid in order to separate the heavy metallic compounds from the toxin in a state of sulfid. The liquid is, then, filtered and partially evaporated, under low temperature, which drives off the superfluous hydrogen sulfid. Next it is evaporated in a vacuum evaporator or in water bath at a temperature not exceeding 60° C. When it attains a syrup-like consistency, absolute alcohol and ether are added, whereby the toxin is thrown out in the form of a more or less colored precipitate. This is again dissolved in water, decolored by animal charcoal and filtered. Absolute alcohol and ether are added to this filtered liquid, and the toxin is precipitated. This is collected by filtering. The toxin thus obtained still contains a kind of basic organic matter and inosite. These need to be got rid of. The toxin is, therefore, dissolved in a small quantity of distilled water; the liquid thus obtained is then left standing for some time until the inosite precipitates in crystal form is separated by filtration. A solution of mercuric chlorid is then added to this filtrate to precipitate organic impurities composed of basic salts completely in the form of an insoluble double salts which is also abstracted by filtration. Into the liquid thus obtained, if alcohol and ether are added, the toxin of *Tetrodon* is precipitated in its purest form, and the superfluous mercuric chlorid solution remains. This precipitate is filtered and separated from the liquid, washed several times by alcohol and ether, and dried in suitable apparatus, when the toxin in question is finally obtained. The toxin thus obtained possesses an exceedingly poisonous nature, so that if it is injected into the body of animals, a remarkably active effect may be observed in the nervous system, and beneficial result is obtained by applying the same to the patients suffering from leprosy or other general neuralgia.

Tetrodotoxin is a white, amorphous, powder, devoid of odor and taste. It readily dissolves in water, in alcohol with difficulty, and scarcely soluble in other organic solvents such as absolute alcohol, ether, chloroform, sulfur dioxid, amyl-alcohol, etc.

When heated tetrodotoxin swells voluminously, accompanied with a change of color to brown, and leaves an abundant charcoal that burns with difficulty. By a complete burning however, no ashes will remain.

An aqueous solution of tetrodotoxin is not precipitated by lead acetate solution but in addition of ammonia thereto will cause it to be carried down with the resulting lead hydroxid. The precipitate of tetrodotoxin thus produced is so firmly combined that repeated washings of the precipitate with a dilute ammonia water can hardly extract even a trace thereof. Tetrodotoxin energetically reduces the Fehling solution as well as an alkaline silver-nitrate solution, but it does not affect potassium ferricyanid. The toxity of tetrodotoxin is easily destroyed by mineral acids, caustic alkalis and strong ammonia. It dissolves when pure, in sulfuric acid, nitric acid and hydrochloric acid without imparting any color thereto.

An aqueous solution of tetrodotoxin is not precipitated either by alkaloid reagents or albuminoid precipitate and gives no biuret reaction. A short duration of boiling of its aqueous solution does not result in any loss of its toxity.

What I claim is:

As an article of manufacture, tetrodotoxin a white, amorphous substance possessing neither odor nor taste, which dissolves readily in water, but with difficulty in alcohol and is entirely insoluble in absolute alcohol, ether, and similar organic solvents, which swells voluminously and changes its color to brown by heating and finally leaves abundant charcoal that burns with difficulty, which is carried down from its aqueous solution by lead hydroxid apparently forming no definite compound therewith which reduces Fehling solution and silver nitrate but which does not affect potassium ferricyanid, whose aqueous solution is not precipitated by either alkaloidal or protein re-agents, and whose aqueous solution is not readily decomposed by boiling of short duration but is easily decomposed by either mineral acids or alkalis.

In testimony whereof I affix my signature, in the presence of two witnesses.

YOSHIZUMI TAHARA.

Witnesses:
H. G. HAWLEY,
SEN-ICHIRO HORIYE.

Copies of this patent may be obtained for five cents each, by addressing the "Commissioner of Patents, Washington, D. C."